March 30, 1965  D. F. McFARLAND  3,175,411
MULTI-SPEED TRANSMISSION
Filed June 25, 1962  2 Sheets-Sheet 2
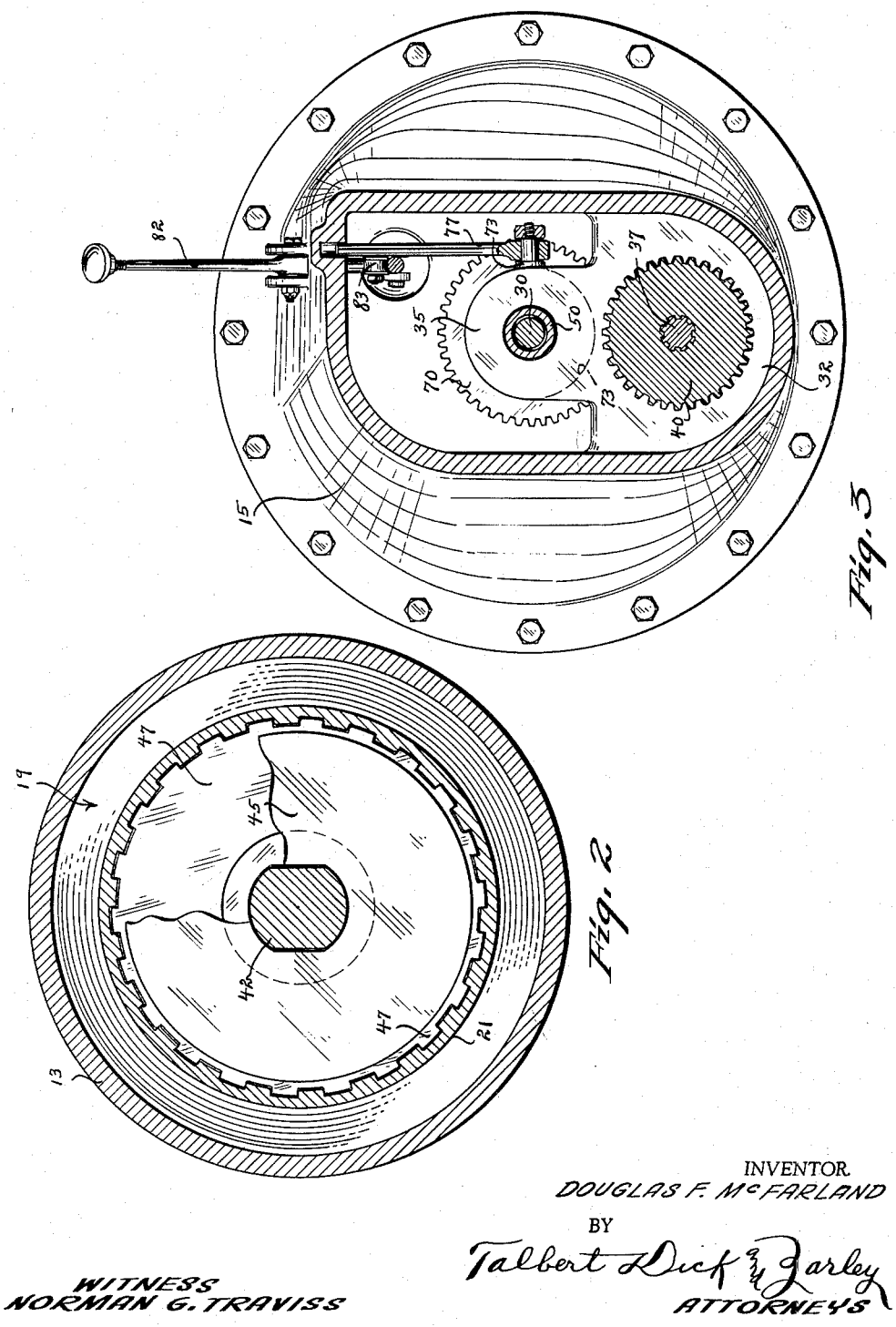
INVENTOR.
DOUGLAS F. McFARLAND
BY
WITNESS
NORMAN G. TRAVISS
ATTORNEYS

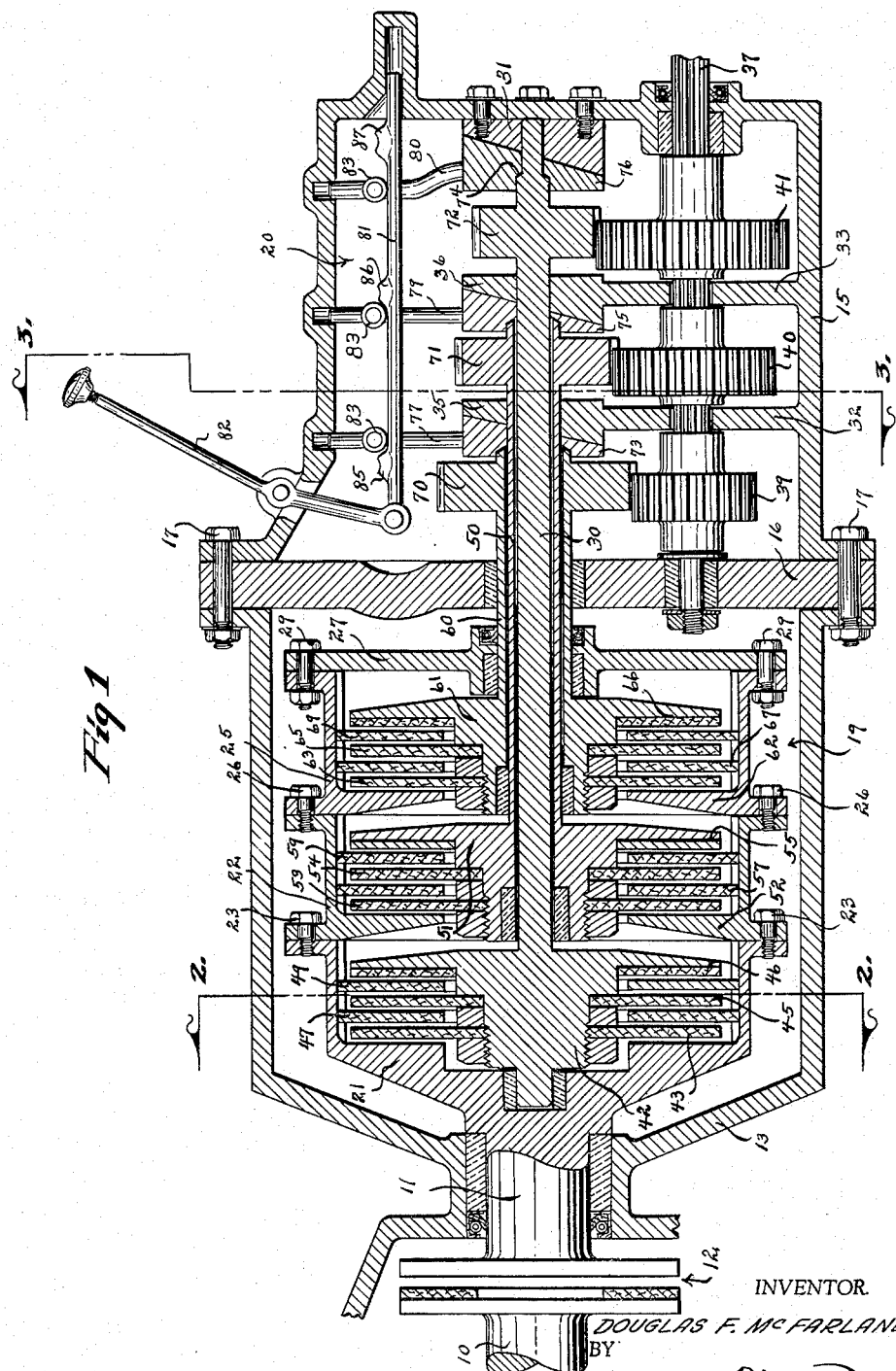

United States Patent Office 3,175,411
Patented Mar. 30, 1965

3,175,411
MULTI-SPEED TRANSMISSION
Douglas F. McFarland, Davis City, Iowa
Filed June 25, 1962, Ser. No. 204,688
9 Claims. (Cl. 74—330)

This invention relates to a multi-speed clutch means, and more particularly to a clutch transmission having a plurality of gear ratios.

The use of clutches, and multi-gear ratio transmissions is old. The usual setup for transferring rotary power having several gear ratios is to have a selective gear transmission, and a clutch means imposed between the power plant and the transmission. The procedure is to disengage the clutch while the gears are being changed from one gear ratio to another gear ratio. Obviously, this requires three operations, i.e., the disengaging of the clutch, changing the transmission gear ratio, and then the engagement of the clutch. This entails not only considerable time and work but requires a certain amount of skill. Furthermore, there is a substantial period of time when there is no connection whatsoever between the prime mover and point of use of the rotary power. In vehicles such as tractors and like this is a serious objection. Still another objection is the rough initial jerk when the gears are operatively connected to the power source and point of use.

Therefore, one of the principal objects of my invention is to provide a multi-speed clutch means that provides smooth rotary power transmission.

A further object of this invention is to provide a transmission means having a plurality of gear ratios that is controlled by a single lever.

A still further object of this invention is to provide a combination clutch and gear speed transmission.

A still further object of this invention is to provide a multi-speed clutch means that may be used to provide a plurality of gear ratios either for forward drive or reverse.

Still further objects of my invention are to provide a multi-gear ratio clutch transmission that is economical in manufacture and durable in use.

These and other objects will become apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a side longitudinal sectional view of my multi-speed clutch transmission, FIG. 2 is a cross-sectional view of the device taken on line 2—2 of FIG. 1, and FIG. 3 is a cross-sectional view of my device, taken on line 3—3 of FIG. 1, and more fully illustrates its construction.

In FIG. 1, I have used the numeral 10 to designate the shaft. This shaft may be operatively connected to the prime mover (not shown) or it may be connected to a reverse mechanism, which in turn is connected to the engine, or it may be the power outlet shaft of my device. For purposes of illustration I will consider it as the power outlet shaft. Therefore, my device, if properly associated with other means, will give a plurality of gear ratios, in either direction of rotation.

The inner shaft of my device is designated by the numeral 11 and may be operatively connected to the shaft 10 by any suitable means, such as a master clutch means 12. The shaft 11 rotatably extends into the housing 13, through the left end of that housing. The detachable right end portion of this housing is designated by the numeral 15.

These two portions of the housing have a wall 16 between them, and this wall and the two sections of the housing are held together by bolts 17. The housing therefore has a first compartment 19 and a second compartment 20. Inside the compartment 19 and secured to the shaft 11 is a cup housing 21. The numeral 22 designates a ring housing portion secured to the open end of the cup housing by cap screws 23. The numeral 25 designates a second ring housing secured to the right of the ring housing 22 by bolts 26. The numeral 27 designates a plate secured to the right of the ring housing 25 by bolts 29. The numeral 30 designates a shaft having its left end rotatably mounted in the center bottom of the cup housing 21, and its right end rotatably mounted to the cam bearing 31 on the inside center rear of the housing 15, as shown in FIG. 1. This shaft 30 has some longitudinal sliding movement. In the compartment 20 are two spaced apart vertical walls 32 and 33, each having a cam bearing at its top. These two cam bearings are designated by the numerals 35 and 36, respectively. The numeral 37 designates a splined shaft, rotatably mounted in the plate wall 16, the right end of the housing 15, loosely extending through the walls 32 and 33, and exiting from the right end of my device. I shall consider this shaft 37, for purposes of illustration, the power shaft operatively connected to the prime mover. The numerals 39, 40 and 41 designate three gear wheels splined on the shaft 37. The gear wheel 41 has a diameter greater than that of the diameter of the gear wheel 40, and the gear wheel 40 has a diameter greater than that of the diameter of the gear wheel 39. The gear wheel 41 is positioned between the wall 33 and right end of the housing 15, the gear wheel 40 is positioned between the walls 32 and 33, and the gear wheel 39 is positioned between the plate 16 and wall 32.

The numeral 42 designates a head rigidly secured on the forward end of the shaft 30 and which is inside the cup housing 21. This head 42 has three spaced apart fixed disc clutch plates 43, 45 and 46. Slidably splined in the cup portion are two disc clutch ring plates 47 and 49. The ring plate 47 is loosely positioned between the plates 43 and 45, and the plate 49 is loosely placed between the plates 45 and 46. The plate 43 is between the inside bottom of the cup housing 21 and the plate ring 47.

The numeral 50 designates a tubular shaft rotatably and slidably mounted around the shaft 30. On the left end of the shaft 50 is a head 51 and which is inside the ring housing 22, which has a flange inwardly extending ring portion 52. The head 51 has three fixed spaced apart disc clutch plates 53, 54 and 55. Slidably splined in the ring housing 22 are two clutch ring plates 57 and 59. The plate 57 is loosely positioned between the plate 53 and the plate 54. The plate 59 is loosely positioned between the plates 54 and 55, and the plate 53 is between the plate 57 and the ring flange 52.

The numeral 60 designates a tubular shaft rotatably and slidably embracing the shaft 50. On the left end of the shaft 60 is a head 61, and which is inside the ring housing 25, which has a flange inwardly extending ring portion 62. The head 61 has three fixed spaced apart disc clutch plates 63, 65 and 66. Slidably splined in the ring housing 25 are two clutch ring plates 67 and 69. The plate 63 is between the ring 62 and the plate 67. The plate 67 is loosely positioned between the plates 63 and 65, and the plate 69 is between the plates 65 and 66.

The numeral 70 designates a gear wheel rigid on the shaft 60 and in mesh with the gear wheel 39. The numeral 71 designates a gear wheel rigid on the shaft 50 and in mesh with the gear wheel 40. The numeral 72 designates a gear wheel rigid on the shaft 30 and in mesh with the gear wheel 41. The gear wheel 70 has a diameter greater than that of the gear wheel 71, and the gear wheel 71 has a diameter greater than that of the diameter of the gear wheel 72.

The numeral 73 designates a cam faced head rotatably slidably embracing the tube shaft 50, having its right side in slidable contact with the cam 35 and its left side in slidable contact with the right end shaft 60. The numeral 75 designates a cam faced head rotatably slidably embracing the shaft 30, having its right side slidably rotatably engaging the cam 36 and its left side slidably engaging the right end of the shaft 50. The numeral 76 designates a cam faced head rotatably embracing the shaft 30, having its right side slidably rotatably engaging the cam 31 and its left side rotatably slidably engaging a shoulder 74 on the shaft 30, as shown in FIG. 1.

The numeral 77 designates a vertically slidable shaft having its lower end operatively connected to the cam head 73, as shown in FIG. 3. In like manner a vertically slidable shaft 79 is secured to the cam head 75 and a vertical slidable shaft 80 is secured to the cam head 76. The numeral 81 designates a horizontal bar horizontally slidably mounted in the upper area of the compartment 20. The left end of the bar is pivoted to the lower end of a lever 82. This lever is pivoted between its two ends to the housing 15, and the upper end of the lever extends out of the housing 15. When the lever 82 is manually moved, the bar 81 will be moved longitudinally within and to the housing 15. Each of the vertical shafts has a roller 83 extending over the bar 81. When the parts of the device are as shown in FIG. 1, there will be a raised portion 85 on the bar 81, to the left of the roller on the shaft.

The practicable operation of the device is as follows: If the shaft 37 is connected to a prime mover and the master clutch 12 is closed, the rotation of the shaft 37 will rotate the shaft 30, but not the shaft 10, provided of course that the control lever 82 is in a neutral position. If the lever 82 is manually moved to the left (when viewing FIG. 1), the roller 83 of the vertical shaft 77 will roll upwardly and onto the raised portion 85 of the bar 81. This will raise the shaft 77, which in turn will rotate the cam head 73. The rotation of the cam head 73 will move it to the left which in turn will slide the shaft 60 to the left and compress and connect the plates 62, 63, 65, 66, 67 and 69 inside the ring housing 25. With the ring housing rotating in "low" gear, the shaft 10 will be rotated in low gear. If the lever 82 is swung to the right, the roller of the shaft 77 will roll from the raised portion 85, and if the lever is moved farther to the right, the roller 83 of the shaft 79 will move up and onto the raised portion 86 of the bar 81. This will raise the shaft 79, move the cam head 75 to the left. The cam head 75 will slide the shaft 50 to the left, thus connecting the clutch plates in the ring housing 22. With the clutch means closed within the ring housing 22, the same will be rotated in "medium" gear ratio and so will the shaft 10. If the lever 82 is still further swung to the right, the roller of the shaft 79 will move from the raised portion 86 and the roller 83 of the vertical shaft 80 will move up and onto the raised portion 87 of the bar 81. This action raises the shaft 80, moving the head 76 to the left. The movement of the cam head 76 to the left will slide the shaft 30 to the left and close the clutch plate means within the cup housing 21. With this clutch means closed, the cup housing and shaft 10 will rotate in a "high" gear ratio. By replacing the lever 82 to a position as shown in FIG. 1, the clutch transmission will be in "neutral gear." As before indicated, the shaft 10 may be connected to the prime mover and the shaft 37, the outlet shaft. When this is the case, the raised portions 85, 86 and 87 will function in reverse, i.e., the roller 83 of the shaft 80 will first be raised onto the raised portion 87 for "low" gear ratio. The roller of the shaft 79 will next be raised onto the raised portion 86 for "intermediate" gear ratio. To obtain "high" gear ratio the roller of the shaft 77 will be moved up and onto the raised portion 85 of the bar 81.

The upper surface area of each of the raised portions 85, 86 and 87 may be concave so that once it is engaged by a roller, the roller will not accidentally become detached.

Some changes may be made in the construction and arrangement of my multi-speed transmission without departing from the real spirit and purpose of my invention, and it is my intention to cover by my claims, any modified forms of structure or use of mechanical equivalents which may be reasonably included within their scope.

I claim:

1. In a multi-speed clutch transmission means,
 a first housing,
 a clutch housing operatively rotatably mounted in said first housing,
 a first shaft rigidly secured to said clutch housing and extending from said first housing,
 a shaft rotatably extending into said clutch housing,
 a second shaft rotatably mounted in said first housing and extending from said first housing,
 a first splined clutch plate ring means in said clutch housing,
 a third shaft rotatably mounted in said first housing and extending into said clutch housing,
 a rigid clutch plate means on said third shaft and adjacent said first plate ring means,
 a first gear wheel on said second shaft,
 a gear wheel on said third shaft and in mesh with said first gear wheel,
 a second splined clutch plate ring means in said clutch housing,
 a first tubular shaft rotatably embracing said third shaft and extending into said clutch housing,
 a rigid clutch plate means on said first tubular shaft and adjacent said second clutch plate ring means,
 a second gear wheel on said second shaft,
 a gear wheel on said first tubular shaft and in mesh with said second gear wheel,
 and a means for selectively longitudinally sliding said third shaft and said tubular shaft;
 said first gear wheel on said second shaft being of a diameter greater than that of the diameter of the gear wheel on said third shaft.

2. In a multi-speed clutch transmission means,
 a first housing,
 a clutch housing operatively rotatably mounted in said first housing,
 a first shaft rigidly secured to said clutch housing and extending from said first housing,
 a shaft rotatably extending into said clutch housing,
 a second shaft rotatably mounted in said first housing and extending from said first housing,
 a first splined clutch plate ring means in said clutch housing,
 a third shaft rotatably mounted in said first housing and extending into said clutch housing,
 a rigid clutch plate means on said third shaft and adjacent said first plate ring means,
 a first gear wheel on said second shaft,
 a gear wheel on said third shaft and in mesh with said first gear wheel,
 a second splined clutch plate ring means in said clutch housing,
 a first tubular shaft rotatably embracing said third shaft and extending into said clutch housing,
 a rigid clutch plate means on said first tubular shaft and adjacent said second clutch plate ring means,
 a second gear wheel on said second shaft,
 a gear wheel on said first tubular shaft and in mesh with said second gear wheel,
 and a means for selectively longitudinally sliding said third shaft and said tubular shaft;

said first gear wheel on said second shaft being of a diameter greater than that of the diameter of the gear wheel on said third shaft, and said second gear wheel on said second shaft having a diameter less than that of the diameter of said gear wheel on said tubular shaft.

3. In a multi-speed clutch transmission means,
a first housing,
a clutch housing operatively rotatably mounted in said first housing,
a first shaft rigidly secured to said clutch housing and extending from said first housing,
a shaft rotatably extending into said clutch housing,
a second shaft rotatably mounted in said first housing and extending from said first housing,
a first splined clutch plate ring means in said clutch housing,
a third shaft rotatably mounted in said first housing and extending into said clutch housing,
a rigid clutch plate means on said third shaft and adjacent said first plate ring means,
a first gear wheel on said second shaft,
a gear wheel on said third shaft and in mesh with said first gear wheel,
a second splined clutch plate ring means in said clutch housing,
a first tubular shaft rotatably embracing said third shaft and extending into said clutch housing,
a rigid clutch plate means on said first tubular shaft and adjacent said second clutch plate ring means,
a second gear wheel on said second shaft,
a gear wheel on said first tubular shaft and in mesh with said second gear wheel,
a third splined clutch plate ring means in said clutch housing,
a second tubular shaft operatively rotatably embracing said third shaft and extending into said clutch housing,
a rigid clutch plate means on said second tubular shaft adjacent said third clutch plate ring means,
a third gear wheel on said second shaft,
a gear wheel on said second tubular shaft and in mesh with said third gear wheel,
and a means for selectively longitudinally sliding said third shaft, said first tubular shaft and said second tubular shaft;
said gear wheels on said second shaft being of different diameters.

4. In a multi-speed clutch transmission means,
a first housing,
a clutch housing operatively rotatably mounted in said fiirst housing,
a first shaft rigidly secured to said clutch housing and extending from said first housing,
a shaft rotatably extending into said clutch housing,
a second shaft rotatably mounted in said first housing and extending from said first housing,
a first splined clutch plate ring means in said clutch housing,
a third shaft rotatably mounted in said first housing and extending into said clutch housing,
a rigid clutch plate means on said third shaft and adjacent said first plate ring means,
a first gear wheel on said second shaft,
a gear wheel on said third shaft and in mesh with said first gear wheel,
a second splined clutch plate ring means in said clutch housing,
a first tubular shaft rotatably embracing said third shaft and extending into said clutch housing,
a rigid clutch plate means on said first tubular shaft and adjacent said second clutch plate ring means,
a second gear wheel on said second shaft,
a gear wheel on said first tubular shaft and in mesh with said second gear wheel,
a third splined clutch plate ring means in said clutch housing,
a second tubular shaft operatively rotatably embracing said third shaft and extending into said clutch housing,
a rigid clutch plate means on said second tubular shaft adjacent said third clutch plate ring means,
a third gear wheel on said second shaft,
a gear wheel on said second tubular shaft and in mesh with said third gear wheel,
and a means for selectively longitudinally sliding said third shaft, said first tubular shaft and said second tubular shaft;
said gear wheels on said second shaft being of different diameters and said gear wheels on said third shaft and tubular shafts being of different diameters.

5. In a multi-speed clutch transmission means,
a first housing,
a clutch housing operatively rotatably mounted in said first housing,
a first shaft rigidly secured to said clutch housing and extending from said first housing,
a shaft rotatably extending into said clutch housing,
a second shaft rotatably mounted in said first housing and extending from said first housing,
a first splined clutch plate ring means in said clutch housing,
a third shaft rotatably mounted in said first housing and extending into said clutch housing,
a rigid clutch plate means on said third shaft and adjacent said first plate ring means,
a first gear wheel on said second shaft,
a gear wheel on said third shaft and in mesh with said first gear wheel,
a second splined clutch plate ring means in said clutch housing,
a first tubular shaft rotatably embracing said third shaft and extending into said clutch housing,
a rigid clutch plate means on said first tubular shaft and adjacent said second clutch plate ring means,
a second gear wheel on said second shaft,
a gear wheel on said first tubular shaft and in mesh with said second gear wheel,
a third splined clutch late ring means in said clutch housing,
a second tubular shaft operatively rotatably embracing said third shaft and extending into said clutch housing,
a rigid clutch plate means on said second tubular shaft adjacent said third clutch plate ring means,
a third gear wheel on said second shaft,
a gear wheel on said second tubular shaft and in mesh with said third gear wheel,
and a cam means for selectively longitudinally sliding said third shaft, said first tubular shaft and said second tubular shaft;
said gear wheels on said second shaft being of different diameters.

6. In a multi-speed clutch transmission means,
a first housing,
a clutch housing operatively rotatably mounted in said first housing,
a first shaft rigidly secured to said clutch housing and extending from said first housing,
a shaft rotatably extending into said clutch housing,
a second shaft rotatably mounted in said first housing and extending from said first housing,
a first splined clutch plate ring means in said clutch housing,
a third shaft rotatably mounted in said first housing and extending into said clutch housing,
a rigid clutch plate means on said third shaft and adjacent said first plate ring means,
a first gear wheel on said second shaft, a gear wheel on said third shaft and in mesh with said first gear wheel, a second splined clutch plate ring means in said clutch housing, a first tubular shaft rotatably embracing said third shaft and extending into said clutch housing, a rigid clutch plate means on said first tubular shaft and adjacent said second clutch plate ring means, a second gear wheel on said second shaft, a gear wheel on said first tubular shaft and in mesh with said second gear wheel, a third splined clutch plate ring means in said clutch housing, a second tubular shaft operatively rotatably embracing said third shaft and extending into said clutch housing, a rigid clutch plate means on said second tubular shaft adjacent said third clutch plate ring means, a third gear wheel on said second shaft, a gear wheel on said second tubular shaft and in mesh with said third gear wheel, and a means for selectively longitudinally sliding said said third shaft, said first tubular shaft and said second tubular shaft;

said gear wheels on said second shaft being of different diameters;

said first, second and third clutch plate means in said clutch housing, and said clutch plate means on said third shaft, and said first and second tubular shafts, each consisting of a plurality of disc ring plates.

7. In a multi-speed clutch transmission means, a first housing, a clutch housing operatively rotatably mounted in said first housing, a first shaft rigidly secured to said clutch housing and extending from said first housing, a shaft rotatably extending into said clutch housing, a second shaft rotatably mounted in said first housing and extending from said first housing, a first splined clutch plate ring means in said clutch housing, a third shaft rotatably mounted in said first housing and extending into said clutch housing, a rigid clutch plate means on said third shaft and adjacent said first plate ring means, a first gear wheel on said second shaft, a gear wheel on said third shaft and in mesh with said first gear wheel, a second splined clutch plate ring means in said clutch housing, a first tubular shaft rotatably embracing said third shaft and extending into said clutch housing, a rigid clutch plate means on said first tubular shaft and adjacent said second clutch plate ring means, a second gear wheel on said second shaft, a gear wheel on said first tubular shaft and in mesh with said second gear wheel, a third splined clutch plate ring means in said clutch housing, a second tubular shaft operatively rotatably embracing said third shaft and extending into said clutch housing, a rigid clutch means on said second tubular shaft adjacent said third clutch plate ring means, a third gear wheel on said second shaft, a gear wheel on said second tubular shaft and in mesh with said third gear wheel, and a means for selectively longitudinally sliding said third shaft, said first tubular shaft and said second tubular shaft;

said gear wheels on said second shaft being of different diameters;

said cam means including a single manually movable member.

8. In a multi-speed clutch transmission means, a first housing, a clutch housing operatively rotatably mounted in said first housing, a first shaft rigidly secured to said clutch housing and extending from said first housing, a shaft rotatably extending into said clutch housing, a second shaft rotatably mounted in said first housing and extending from said first housing, a first splined clutch plate ring means in said clutch housing, a third shaft rotatably mounted in said first housing and extending into said clutch housing, a rigid clutch plate means on said third shaft and adjacent said first plate ring means, a first gear wheel on said second shaft, a gear wheel on said third shaft and in mesh with said first gear wheel, a second splined clutch plate ring means in said clutch housing, a first tubular shaft rotatably embracing said third shaft and extending into said clutch housing, a rigid clutch plate means on said first tubular shaft and adjacent said second clutch plate ring means, a second gear wheel on said second shaft, a gear wheel on said first tubular shaft and in mesh with said second gear wheel, a third splined clutch plate ring means in said clutch housing, a second tubular shaft operatively rotatably embracing said third shaft and extending into said clutch housing, a rigid clutch plate means on said second tubular shaft adjacent said third clutch plate ring means, a third gear wheel on said second shaft, a gear wheel on said second tubular shaft and in mesh with said third gear wheel, and a means for selectively longitudinally sliding said third shaft, said first tubular shaft and said second tubular shaft;

said first gear wheel on said second shaft having a diameter greater than that of the diameter of said gear wheel on said third shaft, said second gear wheel on said second shaft being of a diameter less than that of the diameter of said gear wheel on said first tubular shaft, and said third gear wheel on said second shaft being of substantially the same diameter as that of the diameter of the gear wheel on said second tubular shaft.

9. In a multi-speed clutch transmission means, a first housing, a clutch housing operatively rotatably mounted in said first housing, a first shaft rigidly secured to said clutch housing and extending from said first housing, a shaft rotatably extending into said clutch housing, a second shaft rotatably mounted in said first housing and extending from said first housing, a first splined clutch plate ring means in said clutch housing, a third shaft rotatably mounted in said first housing and extending into said clutch housing, a rigid clutch plate means on said third shaft and adjacent said first plate ring means, a first gear wheel on said second shaft, a gear wheel on said third shaft and in mesh with said first gear wheel, a second splined clutch plate ring means in said clutch housing, a first tubular shaft rotatably embracing said third shaft and extending into said clutch housing, a rigid clutch plate means on said first tubular shaft and adjacent said second clutch plate ring means, a second gear wheel on said second shaft, a gear wheel on said first tubular shaft and in mesh with said second gear wheel, a third splined clutch plate ring means in said clutch housing, a second tubular shaft operatively rotatably embracing said third shaft and extending into said clutch housing, a rigid clutch plate means on said second tubular shaft adjacent said third clutch plate ring means, a third gear wheel on said second shaft, a gear wheel on said second tubular shaft and in mesh with said third gear wheel, and a means for selectively longitudinally sliding said third shaft, said first tubular shaft and said second tubular shaft;

said first gear wheel on said second shaft having a diameter greater than that of the diameter of said gear wheel on said third shaft, said second gear wheel on said second shaft being of a diameter less than that of the diameter of said gear wheel on said first tubular shaft, and said third gear wheel on said second shaft being of substantially the same diameter as that of the diameter of the gear wheel on said second tubular shaft;

said first gear wheel on said second shaft having a diameter greater than that of the diameter of either said second and third gear wheels on said second shaft, and said third gear wheel on said second shaft having a diameter greater than that of the diameter of said second gear wheel on said shaft.

References Cited by the Examiner

UNITED STATES PATENTS 2,620,679  12/52  Issigonis et al. _____ 74—330

DON A. WAITE, *Primary Examiner.*